(12) United States Patent
Izquierdo Ereño et al.

(10) Patent No.: US 10,201,926 B2
(45) Date of Patent: Feb. 12, 2019

(54) THERMOFORMING MACHINE AND METHOD OF INSTITUTING A FORMAT CHANGE

(71) Applicant: ULMA Packaging Technological Center, S.COOP., Oñati (ES)

(72) Inventors: Eneko Izquierdo Ereño, Oñati (ES); Carmelo Arregui Maiztegui, Oñati (ES)

(73) Assignee: ULMA PACKAGING TECHNOLOGIES CENTER, S.COOP., Onati (ES)

( * ) Notice: Subject to any disclaimer, the term of this patent is extended or adjusted under 35 U.S.C. 154(b) by 921 days.

(21) Appl. No.: 14/574,233

(22) Filed: Dec. 17, 2014

(65) Prior Publication Data

US 2015/0174815 A1    Jun. 25, 2015

(30) Foreign Application Priority Data

Dec. 18, 2013   (EP) .................................... 13382522

(51) Int. Cl.
| | |
|---|---|
| *B29C 51/26* | (2006.01) |
| *B29C 31/00* | (2006.01) |
| *B29C 51/08* | (2006.01) |
| B29C 51/04 | (2006.01) |
| B29L 31/00 | (2006.01) |

(52) U.S. Cl.
CPC .......... *B29C 51/261* (2013.01); *B29C 31/006* (2013.01); *B29C 51/087* (2013.01); *B29C 51/26* (2013.01); *B29C 51/04* (2013.01); *B29C 51/082* (2013.01); *B29L 2031/00* (2013.01)

(58) Field of Classification Search
CPC ................................................... B29C 51/261
See application file for complete search history.

(56) References Cited

U.S. PATENT DOCUMENTS

| | | | |
|---|---|---|---|
| 7,361,008 | B2 | 4/2008 | Crepaz |
| 2009/0266028 | A1 | 10/2009 | Zeller et al. |
| 2013/0212988 | A1 | 8/2013 | Schmeiser et al. |
| 2013/0308996 | A1 | 11/2013 | Rodi |
| 2014/0237942 | A1 | 8/2014 | Geble |

FOREIGN PATENT DOCUMENTS

| | | | |
|---|---|---|---|
| EP | 1234765 A1 | | 8/2002 |
| EP | 1520682 | * | 4/2005 |
| EP | 2052979 A1 | | 4/2009 |
| EP | 2380811 A1 | | 10/2011 |
| EP | 2383091 A1 | | 11/2011 |
| WO | WO2011104036 A2 | | 9/2011 |

\* cited by examiner

*Primary Examiner* — Larry W Thrower
(74) *Attorney, Agent, or Firm* — Edell, Shapiro & Finnan, LLC

(57) ABSTRACT

Format change method for a thermoforming machine and a thermoforming machine. A station of the machine includes an upper tool and a lower tool, at least one of the upper and lower tools being suitable for moving in a substantially vertical actuating direction during the operation of the machine. In the method, the upper tool is supported on the lower tool and both tools are subsequently withdrawn from the station and are replaced with new tools. When withdrawing the upper and lower tools from the station and when introducing the new tools therein, the tools are moved simultaneously and jointly in a replacement direction different from the actuating direction.

11 Claims, 13 Drawing Sheets

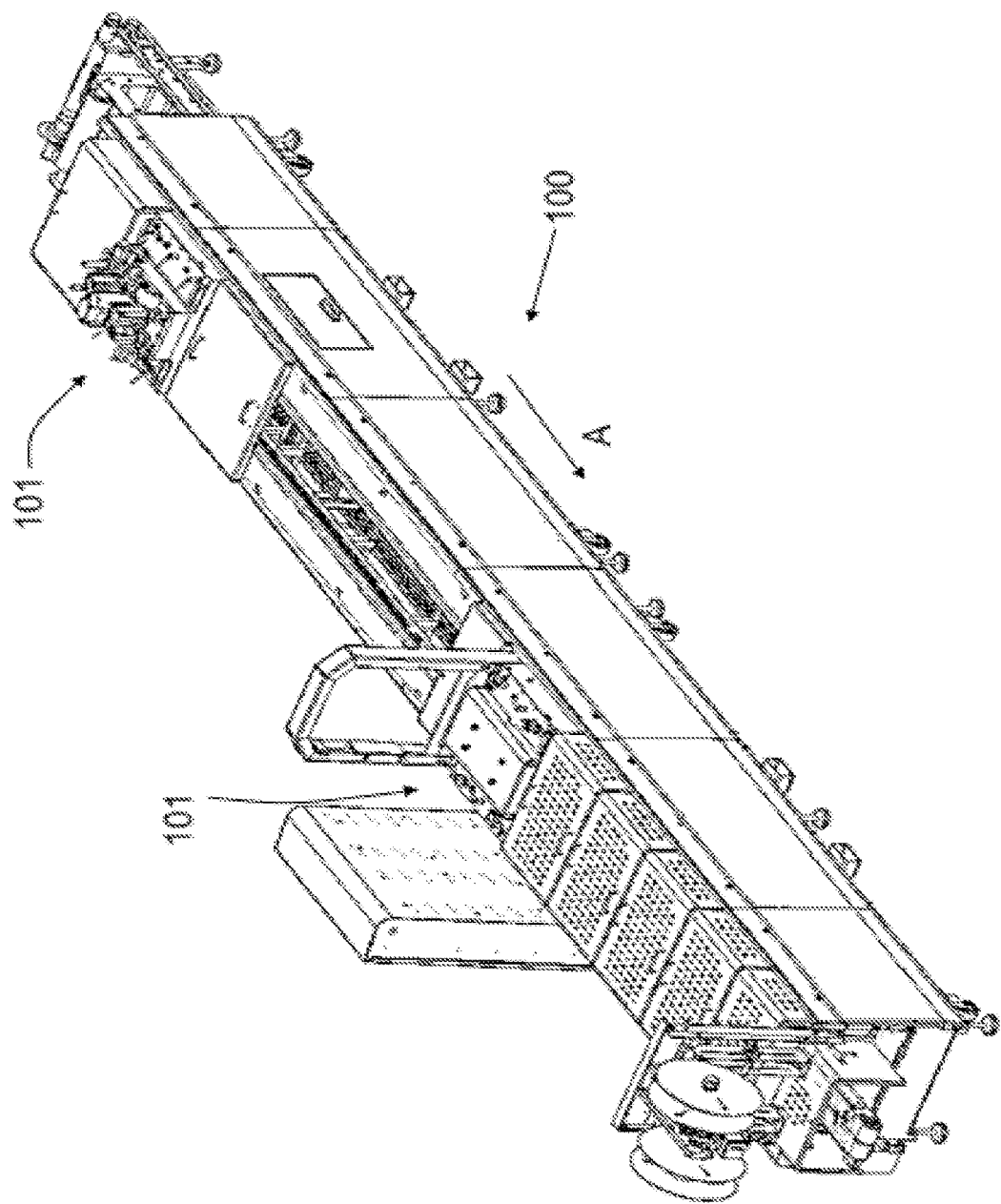

THERMOFORMING MACHINE AND METHOD OF INSTITUTING A FORMAT CHANGE

CROSS-REFERENCE TO RELATED APPLICATIONS

The present application relates to and claims the benefit and priority to European Application No. EP13382522.4, filed Dec. 18, 2013.

TECHNICAL FIELD

The present disclosure relates to format change methods for thermoforming machines and to thermoforming machines.

BACKGROUND

Thermoforming machines are used to generate a container from a sheet. These machines comprise an upper tool and a lower tool with a specific configuration, cooperating with one another to shape a sheet and thus generate a container. The sheet is arranged between both tools and is deformed when the tools move close to one another, taking the shape of the tools, corresponding with the desired shape of the container. This function is referred to as forming, and the machine comprises a forming station where the tools are arranged and where the sheet is deformed to obtain the desired end container.

The machine can further comprise a sealing station with other tools also cooperating with one another, where an upper sheet or cover is sealed to the previously formed container with the product already in it. As in the forming station, the design of the tools of the sealing station also depends on the shape of the container, but these tools can be different from the tools of the forming station because their function is to seal the container previously generated in the forming station.

If a container having a different shape is to be generated, the tools have to be replaced with other tools with the suitable configuration, both in the forming station and in the sealing station, an operation known as a format change.

Document EP 2383091 A1 belonging to the present assignee discloses a packaging machine comprising a tool change system, whereby a lower tool of the machine can be replaced in a fast and simple manner.

Various ways to change the format, in which the lower tool and the lower tool are changed separately in order to make the format change, are known of the state of the art, such as those which are disclosed in documents EP 2052979 A1, EP 1234765 A1 and EP 2380811 A1.

Document EP 2052979 A1 discloses a format change where the lower tool is changed by removing it from the corresponding station of a packaging machine below the sheet. In another additional operation, the upper tool is changed by removing it from the corresponding station of a packaging machine above the sheet. For this last task, a cover is released and removed from a mechanism where the upper tool is arranged, and the upper tool is removed from the mechanism through the free space that is left when the cover is removed. This way of changing the format further allows not having to cut and move the sheet(s).

Document EP 1234765 A1 discloses a machine with a first transfer store for replacing the lower tool and a second transfer store for replacing the upper tool, each tool being replaced separately. The first transfer store is arranged below the sheet and the second transfer store is arranged above the sheet, such that they do not affect the sheet.

Document EP 2380811 A1 discloses a packaging machine with a forming station and a sealing station in which an upper tool and a lower tool cooperating with one another act to generate a container and to seal the container, respectively. In at least one of the stations the machine comprises a first transfer store arranged below the sheet for the lower tool and a second transfer store arranged above the sheet for the upper tool, each tool being replaced separately.

This way of changing the format, by changing the lower tool and the lower tool separately, can have the advantage, at least in some cases, of facilitating the work of the operator (or operators) responsible for making the change, but in contrast it can involve a long format change time because two independent changes (two tasks) are required, which can be prejudicial in production terms, and therefore in financial terms.

Document WO 2011104036 A2 discloses a format change method for a packaging machine in which a lower tool and an upper tool of the machine are changed. Both tools are replaced above the machine, so they are lifted by means of an actuator to a position above the machine where an operator can replace them with other tools, which are subsequently introduced again in the machine by lowering them. For the format change, the two tools are decoupled, respectively, from a lower part and from an upper securing block of the forming station to which they are coupled during normal operative or operational working of the machine, and the securing block of the forming station moves in order to be able to move the tools in a vertical direction until arranging them above the machine.

SUMMARY OF THE DISCLOSURE

Disclosed herein are format change methods associated with thermoforming machines. A thermoforming machine generally include different stations, and in at least one of the stations has an upper tool and a lower tool which are suitable for moving towards or moving away from one another during the operational working of the machine, acting on a sheet to shape it or to seal it with a cover sheet, by means of an operative movement of at least one of the tools in a substantially vertical actuating direction. Format change must be understood as replacing the tools with new ones that have a new configuration or shape.

According to one implementation the method comprises a decoupling step in which the upper tool is supported or rests on the lower tool, a removal step in which both tools are withdrawn from the station simultaneously and jointly, a replacement step in which, with the tools removed from the station, the tools are replaced with new tools, the new upper tool being supported or resting on the new lower tool, and an insertion step in which the new tools are introduced in the station simultaneously and jointly.

During the removal step and the insertion step, the corresponding upper and lower tools move in a replacement direction different from the actuating direction simultaneously and jointly, such that the tools can be easily replaced, both in the same operation, without needing to dismount or handle parts of the station which may increase the time needed to change the format of the machine, in addition to including operations that may require greater effort from the operator (or operators) responsible for making the format change.

According to some implementations the thermoforming machine comprises at least one station with a lower tool housed in a box and an upper tool attached to a securing block, which tools are suitable for moving at least with respect to one another in a substantially vertical actuating direction, moving towards one another to act on a sheet or moving away from one another. The upper tool is caused to be supported or rest on the lower tool to change the format.

The machine comprises removal means suitable for guiding the movement of both tools when they are withdrawn from the station simultaneously and jointly and when they are introduced in the station during a format change process, the removal means causing the guided movement of the tools in a replacement direction different from the actuating direction. The tools of the machine can thus be easily replaced, both in the same operation, without needing to dismount or handle parts of the station of the machine which may increase the time needed to change the format of the machine, in addition to including operations that may require greater effort from the operator (or operators) responsible for making the format change. Furthermore, there is no need for element of the machine to be oversized in order to carry out the format change, and elements or parts of the machine (of the station) that are not actively involved in the format change do not have to be moved, which allows obtaining a more compact machine that is simpler to design. Furthermore, since both tools are replaced jointly, there is no need for a format change mechanism for each tool, the complexity of the machine being reduced, even offering the possibility of a rapid and simple format change.

These and other advantages and features will become evident in view of the drawings and the detailed description.

BRIEF DESCRIPTION OF THE DRAWINGS

FIG. 1 shows a perspective view of a thermoforming machine according to one implementation.

FIG. 3b shows by way of example a perspective view of a lower tool of the machine of FIG. 1 housed in a box, the lower tool being compatible for use with the upper tool of FIG. 3a.

DETAILED DESCRIPTION

Figure 2A:
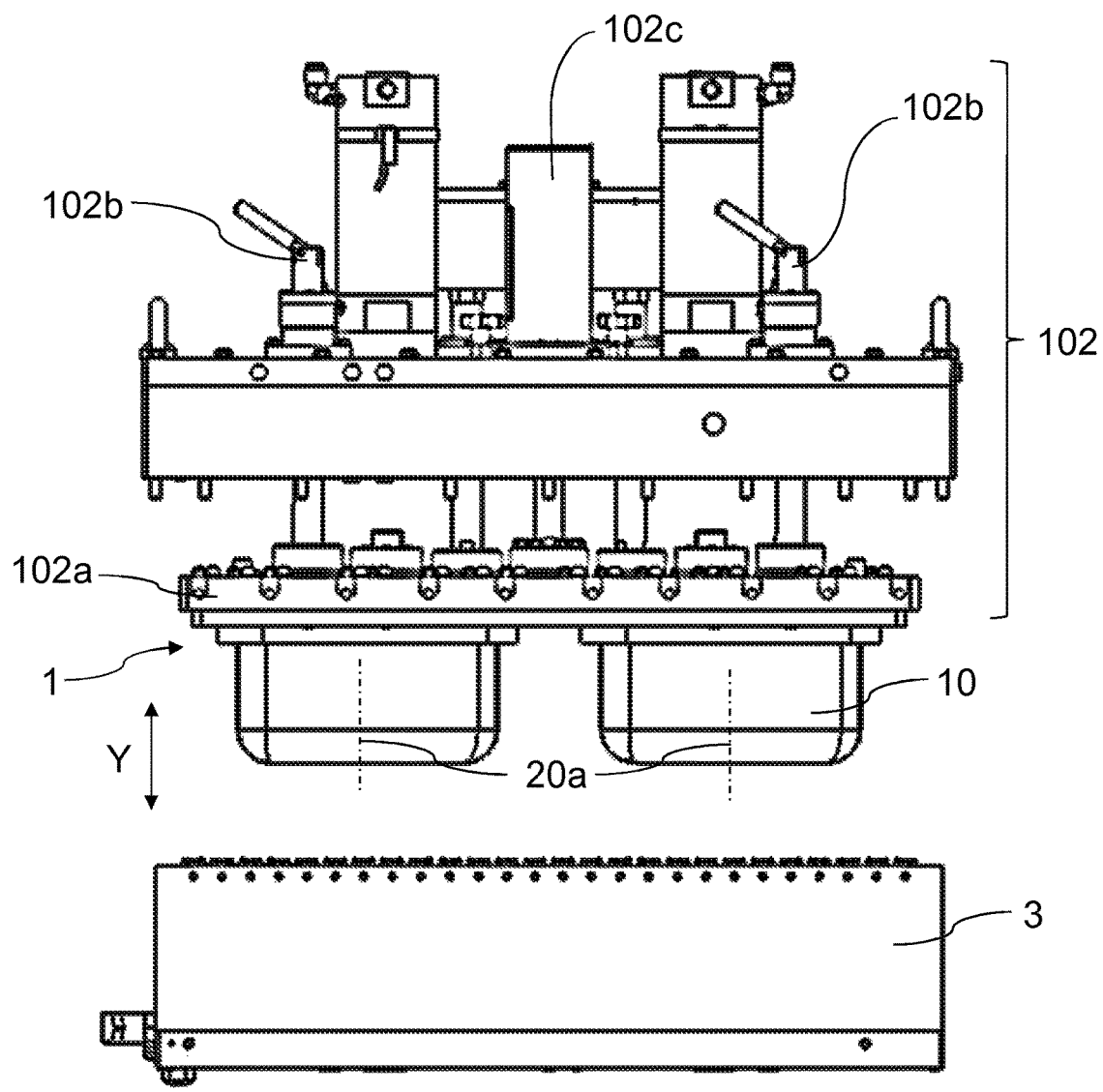
FIG. 2a shows a side view of a box where a lower tool is housed, and of an upper tool of the thermoforming machine of FIG. 1, together with a securing block of the machine, with the upper tool and the lower tool arranged in a standby position before starting a format change.

Disclosed herein are methods for changing the format of a thermoforming machine 100 such as that shown by way of example in FIG. 1. The thermoforming machine 100 comprises at least one station 101 shown by way of example in FIGS. 2a, 2b, 2c, 2d and 2e, where there are arranged an upper tool 1 and a lower tool 2 which are suitable for moving towards or moving away from one another during the operational working of the machine 100 by means of the movement of at least one of the tools in a substantially vertical actuating direction Y. Operational working of the machine 100 must be understood as the normal operation of the machine, where the tools 1 and 2 cooperate with one another to act on at least one sheet which is arranged between them and moves in a forward movement direction A, corresponding with the longitudinal direction of the machine 100 itself.

The station 101 of the machine where the tools 1 and 2 are arranged may correspond with a forming station. In this case, the tools 1 and 2 comprise a specific configuration or shape, as shown by way of example in FIGS. 3a and 3b, for the purpose of generating from the sheet containers having a specific shape. To generate a container (not depicted in the drawings) the upper tool 1 comprises a protrusion 10 (male) and the lower tool 2 comprises a cavity 20 (female) for the protrusion 10, such that when the tools 1 and 2 move towards one another and cooperate, the protrusion 10 enters the cavity 20, deforming the sheet, and the container is generated with the shape of the protrusion 10 and the cavity 20. The protrusion 10 and the corresponding cavity 20 are centered, comprising a common central axis 20a, but the protrusion 10 is smaller than the cavity 20 (both in width and in height), such that during the operational working of the machine, when the tools 1 and 2 cooperate with one another they do not contact one another and between the walls of the cavity 20 and of the corresponding protrusion 10 there is a space which allows deforming the sheet on one hand and preferably allows the walls of the cavity 20 to not touch the sheet on the other hand to prevent the risk of forming creases in the formed sheet. The tools 1 and 2 can be suitable for generating a single container every time they cooperate with one another, comprising a single protrusion 10 and a single cavity 20, or a plurality of containers for which purpose each one comprises a plurality of protrusions 10 and a plurality of cavities 20, respectively, as is the case of the example shown in FIGS. 3a and 3b, where two protrusions 10 and two respective cavities 20 are shown. If containers having a different shape are to be generated, the tools 1 and 2 must be replaced with other tools 1 and 2 suitable for generating containers with the new required shape. Tools 1 and 2 are replaced by a method known as a format change.

The station 101 of the machine can also correspond with a sealing station having upper and lower tools, where the function of the tools is no longer to generate a container (shaping a sheet), but rather to seal the container previously generated in a forming station such as the one discussed above. In this case, the upper tool comprises sealing means capable of welding an upper sheet to the flaps of the previously formed container or containers, and the lower tool comprises housings for housing the previously formed container or containers and provides support along the flaps of each container on which the upper tool and the upper sheet will be supported in the sealing operation. The sealing station upper and lower tools, not depicted in the drawings, need to have a specific configuration to adapt to the container generated by the tools 1 and 2 of the forming station, and if the shape of the container changes, it may also be necessary to replace the sealing station. The format change method can thus be applied in different stations of a thermoforming machine 100.

Hereinafter the method steps of replacing upper and lower tools associated with a station of the thermoforming machine 100 will be described in conjunction with the forming station 101. It is appreciated, that the same or similar method steps may be employed with respect to replacing upper and lower tools associated with other stations of the thermoforming machine, such as a sealing station.

Figure 2B:
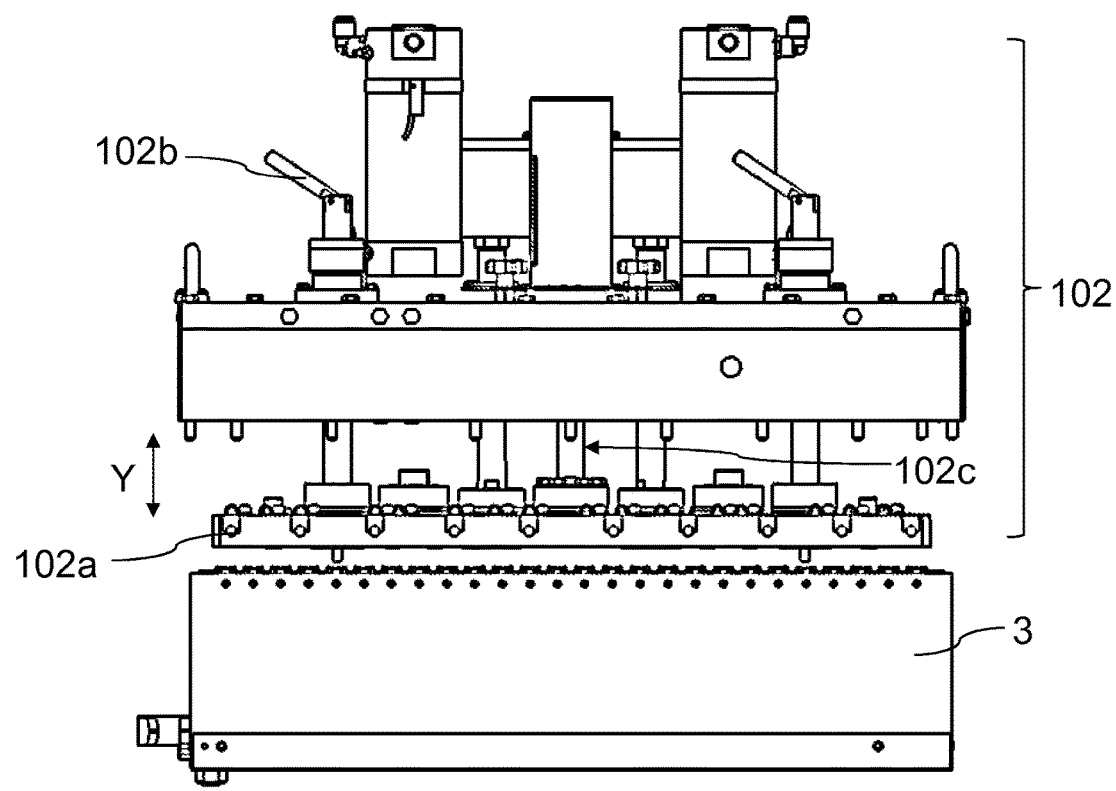
FIG. 2b shows a side view of the elements of FIG. 2a, with the upper tool supported or resting on the lower tool during a format change.
Figure 3B:
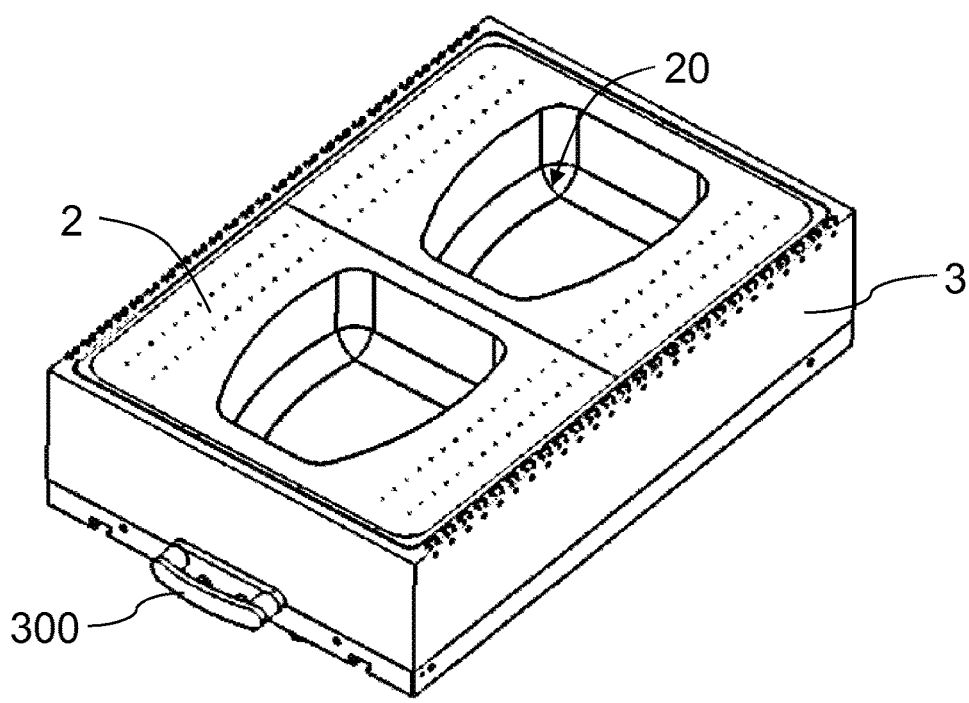
Figure 4:
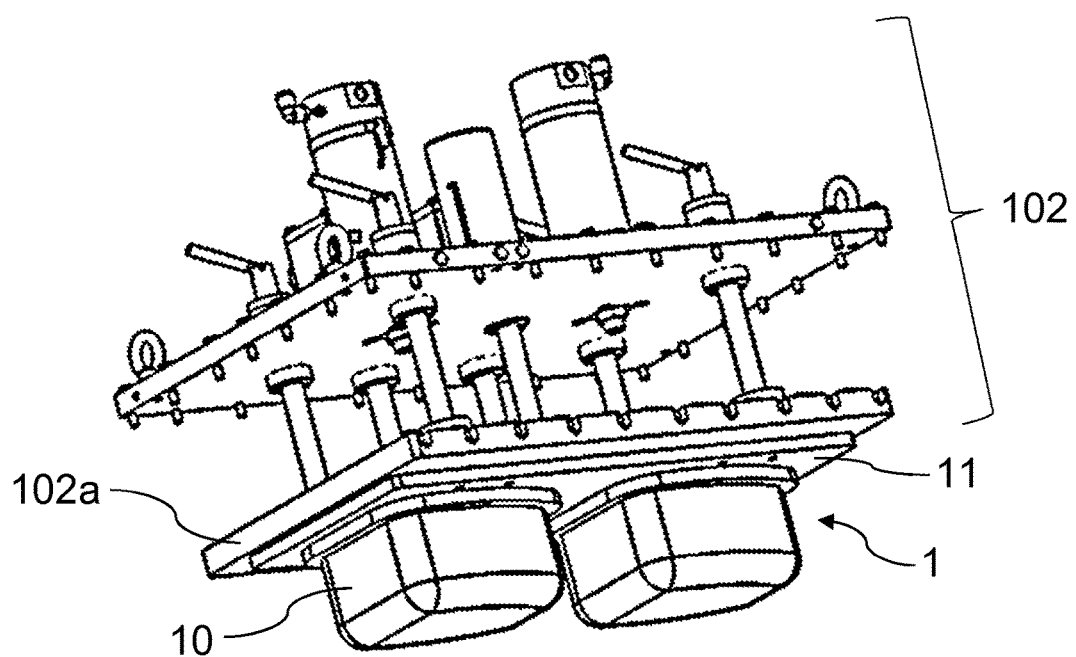
FIG. 4 shows a perspective view of a securing block of the machine of FIG. 1, with the upper tool coupled thereto.
Figure 5:
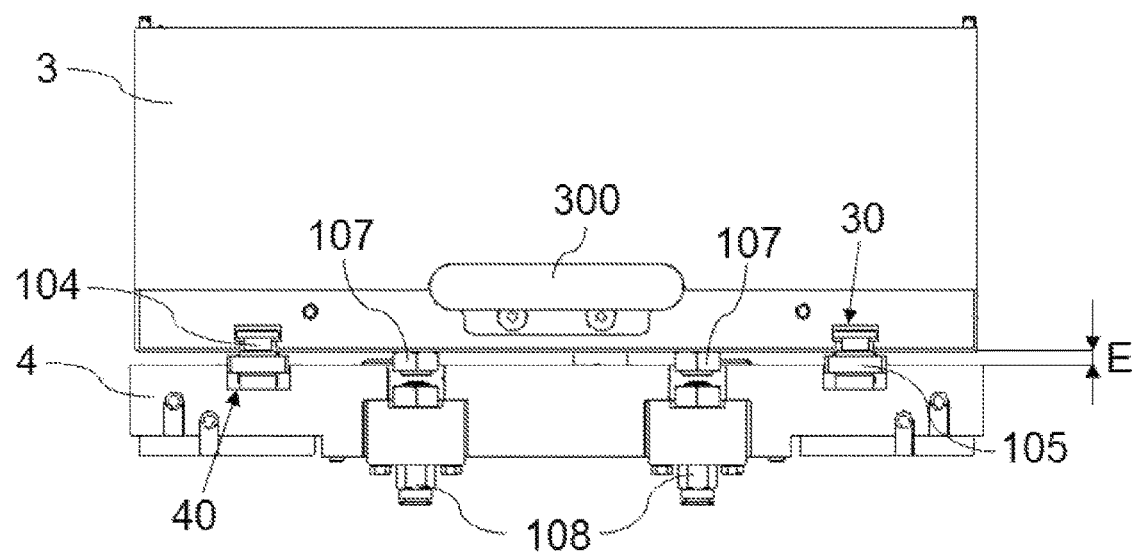
FIG. 5 shows a box and a table of the machine of FIG. 1 separated from one another by a separation distance.

According to some implementations the lower tool 2 of forming station 101 is arranged in a box 3. According to some implementations the lower tool 2 is housed in the box 3 so that the upper surface thereof is flush with an upper surface of the box. According to some implementations the box 3 is attached or coupled to a table 4 as shown in FIGS. 2a-c, 3b and 5. FIG. 5 shows the box 3 in a decoupled position, being spaced apart from the table by a distance E. According to some implementations the upper tool 1 is attached or coupled to a securing block 102 as shown in FIGS. 2a and 4. An actuating means (not depicted in the drawings) is configured to cause the movement of at least one of the tools 1 and 2 in the actuating direction Y. During the operational working of the machine 100 the box 3 and the table 4 move together with the lower tool 2, and at least part of the securing block 102 can move together with the upper tool 1. The securing block 102 may or may not be heated in order to heat the upper tool 1 if required (in which case the upper tool 1 would be heated), in which case the upper tool 1 would be attached to a moving securing plate 102a of the securing block 102. The box 3 can comprise an associated cooling circuit (not depicted in the drawings) in order to cool the lower tool 2 if required.

The method may comprise a plurality of steps that will be described below in reference to FIGS. 2a-2e. According to some implementations the method begins with the upper tool 2 coupled to the securing block 102 and with the box 3 that houses the lower tool 2 coupled to the table 4 as shown in FIG. 2a, the upper and lower tools being spaced-apart from one another. According to some implementations the position of each of the upper and lower tools 1 and 2 corresponds with a standby position during the normal operation of the thermoforming machine 100.

According to some implementations the format change method starts with the sheet at least partially removed from the station 101 and the tools 1 and 2 in their respective standby positions as depicted in FIG. 2a. According to some implementations the tools 1 and 2 are spaced as far from one another as possible without the sheet being located between the tools 1 and 2. According to other implementations the starting position of the tools 1 and 2 may be different.

Prior to initiating the format change the sheet may be removed from the forming station 101 or may otherwise be cut to form a window for the passing of the upper tool 1 through the sheet during the format change process. The cutting of a window in the sheet advantageously allows the thermoforming machine to commence operation after the format change immediately after the format change without delay.

The format change method comprises a decoupling step in which the upper tool 1 is supported or rests on the lower tool 2, a removal step, after the decoupling step, in which both tools 1 and 2 are withdrawn from the station 101 simultaneously and jointly, a replacement step, after the removal step, in which the tools 1 and 2 are replaced with new upper and lower tools outside the station 101, the new upper and lower tools 1 and 2 being arranged such that one is supported or resting on the other (the upper tool 1 on the lower tool 2), and an insertion step, after the replacement step, in which the new upper and lower tools 1 and 2 are introduced in the station 101 simultaneously and jointly.

During the removal step and the insertion step, the corresponding tools 1 and 2 move in a replacement direction X different from the actuating direction Y simultaneously and jointly, so it is not necessary to handle other elements of the station 101, such as the securing block 102, for example, for taking out or introducing tools 1 and 2 in the station 101. Not needing to handle such elements simplifies the format change as fewer steps are needed to obtain the format change, thereby reducing the time needed to carry it out. Furthermore, the risk of damaging or of the maladjustment of the mechanisms housed by the securing block 102, such as a piston 102c which causes the securing plate 102a to move or fastening means 102b (screws or any conventional fastening means) keeping the upper tool 1 coupled to the securing block 102 when required, is eliminated. The handling of such elements can be uncomfortable for the operator responsible for doing so, and it can even be dangerous as in the case of a heated securing block 102 comprising a high temperature, and it may require efforts that are not suitable for all operators due to the weight thereof.

According to some implementations the replacement direction X is substantially horizontal, such that the tools 1 and 2 can be taken out of the station 101 and introduced in the station 101 in a simple manner without having to resize any element of the machine 100, as could be the case when greater movement of the tools 1 and 2 in the actuating direction Y is required than what is needed during the operational working of the machine 100, in which case the actuating means responsible for causing the movement would have to be oversized.

The format change method also allows that the tools 1 and 2 can be removed and introduced in the station 101 below the plane of the sheet, such that both tools 1 and 2 are accessible in an ergonomic manner for the operator responsible for making the format change. To guide the sheet and cause it to move in the forward movement direction A, the thermoforming machine 100 comprises a structure 1000 that secures, guides and moves the sheet in the forward movement direction A. The structure 1000 extends longitudinally and is at the height of the sheet. Since the tools 1 and 2 are caused to move in the replacement direction X below the plane of the sheet, the two tools 1 and 2 are capable of passing below the structure 1000, which facilitates the work of the operator. According to some implementations the upper tool 1 is supported or rests on the lower tool 2 such that both tools 1 and 2 are in direct contact with one another.

In the decoupling step at least one of the tools 1 and 2 is caused to move towards the other tool in the actuating direction Y until the upper tool 1 is supported or rests on the lower tool 2, and the upper tool 1 is then decoupled from the securing block 102, the upper tool 1 thus being decoupled from the station 101 to allow its subsequent withdrawal from the station 101 for replacement. According to some implementations both tools 1 and 2 are caused to move in the operating direction Y in opposite directions until both tools 1 and 2 directly contact one another as shown in FIG. 2b, the upper tool 1 thus resting on the lower tool 2, and the decoupling is performed manually by acting on the fastening means 102b (screws or any conventional fastening means) that keep the securing block 102 and the upper tool 1 attached or coupled. For decoupling, it is not necessary to remove any element from the securing block 102 (other than the fastening means), which prevents the risk of an element of the securing block 102 being lost or deteriorating during the format change, or of the operator forgetting to put it back in place. According to some implementations the tools 1 and 2 are moved in the actuating direction Y by the same actuating means that causes the tools 1 and 2 to move during the operational working of the machine 100. With the upper tool 1 supported or resting on the lower tool 2 and with the upper tool 1 decoupled from the securing block 102, the removal step commences.

In the removal step both tools 1 and 2 are caused to separate from the securing block 102 at least a separation distance E by means of the movement of the tools 1 and 2 or of the securing plate 102a of the securing block 102 in the actuating direction Y, or even with the movement of both the tools 1 and 2 and the securing plate 102a. Since the upper tool 1 is supported on the lower tool 2 and decoupled from the securing block 102, the upper tool 1 moves together with the lower tool 2 (and with the box 3 and the table 4). According to some implementations, the tools 1 and 2 move in the actuating direction Y by means of the actuating means used during the normal operation of the thermoforming machine 100, and they preferably move until the box 3 reaches its standby position (coinciding with the standby position of the lower tool 2). According to other implementations the tools 1 and 2 move to an intermediate position between the position in which they are arranged at the beginning of the removal step and the standby position of the box 3.

Figure 2C:
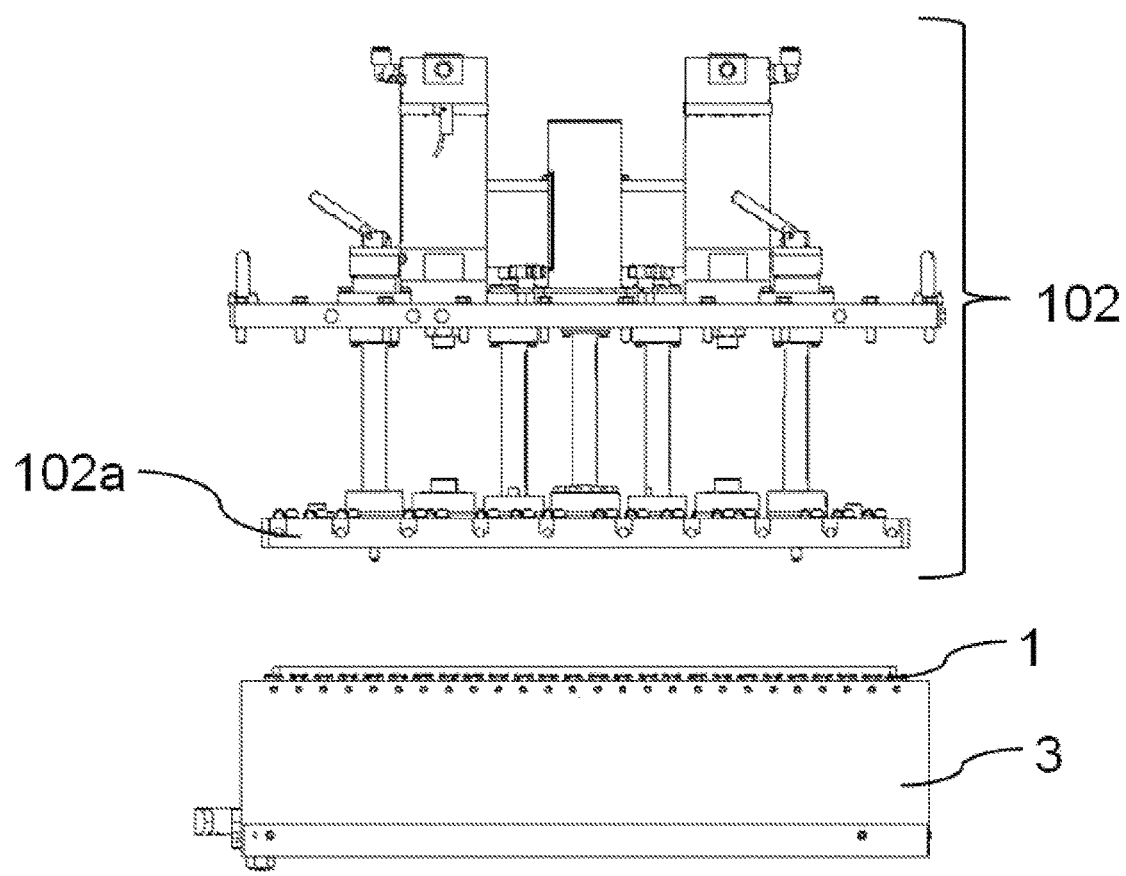
FIG. 2c shows a side view of the elements of FIG. 2a, with the box that houses the lower tool prepared for being decoupled from a table during a format change.

After the tools 1 and 2 assume a position as shown in FIG. 2c, the box 3 is decoupled from the table 4, moving a separation distance E in the actuating direction Y towards the securing block 102 away from table 4 as shown in FIG. 5; hence the need to have previously separate the tools 1 and 2 from the securing block 102 at least the separation distance E. Both tools 1 and 2 are thus decoupled from the station 101 in the removal step, being able to be removed therefrom (together with the box 3). When the box 3 is caused to move the separation distance E with respect to the table 4, the box 3 is positioned in a removal position corresponding with the position of the box 3 in the actuating direction Y in which it is prepared for being removed from the station 101 by means of at least one movement in the replacement direction X, and more specifically in which the box 3 is aligned with at least one guide rail 103 which will be described below and over which the box 3 slides during removal from the station 101 in the replacement direction X.

According to some implementations, as discussed above, the box 3 may form a part of a cooling circuit. According to such implementations when the box 3 is decoupled from the table 4 in the removal step, the cooling circuit inlet and outlet conduits associated with the box 3 are also closed, such that two operations are performed in one and the same step, reducing the time needed to carry out these two steps and facilitating the work of the operator. Therefore, when the upper tool 1 is heated, the box 3 can comprise a cooling circuit therein to cool the lower tool 2 and favor forming the sheet of the container. The cooling circuit is filled with water or another coolant fluid to cool the lower tool 2, and at the same time the box 3 is decoupled from the table 4, the cooling circuit inlet and outlet conduits are closed, preventing the contents thereof from coming out of the box 3, and eliminating the need to perform a purging or draining step prior to decoupling the box 3 and the table 4.

Figure 2D:
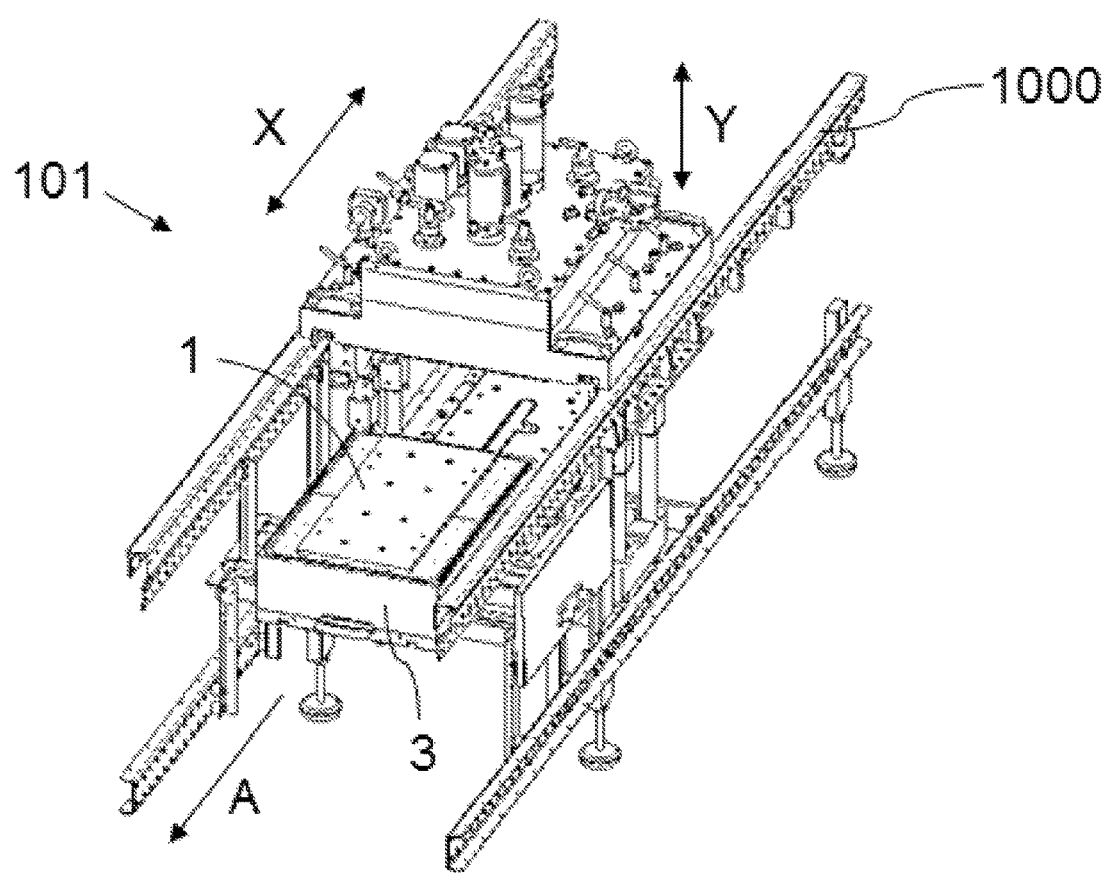
FIG. 2d shows a perspective view of a station of the thermoforming machine of FIG. 1 together with at least part of a structure of the thermoforming machine, with the upper and lower tools located outside the station in a first lateral position as a result of a movement of the tools in a replacement direction during a format change.

To conclude the removal step, the tools 1 and 2 move in the replacement direction X, being withdrawn from the station 101, and to that end the operator (or automatic means) cause the box 3 to move over the guide rail 103. To help the operator move the box 3, and therefore the tools 1 and 2, the box 3 can comprise a handle 300 or an equivalent element for such purpose. According to some implementations, the replacement direction X is substantially horizontal and longitudinal with respect to the machine 100. The movement of the tools 1 and 2 in the replacement direction X places the tools 1 and 2 outside the station 101 as shown in FIG. 2d, and can be handled by the operator for replacing them with others.

Figure 2E:
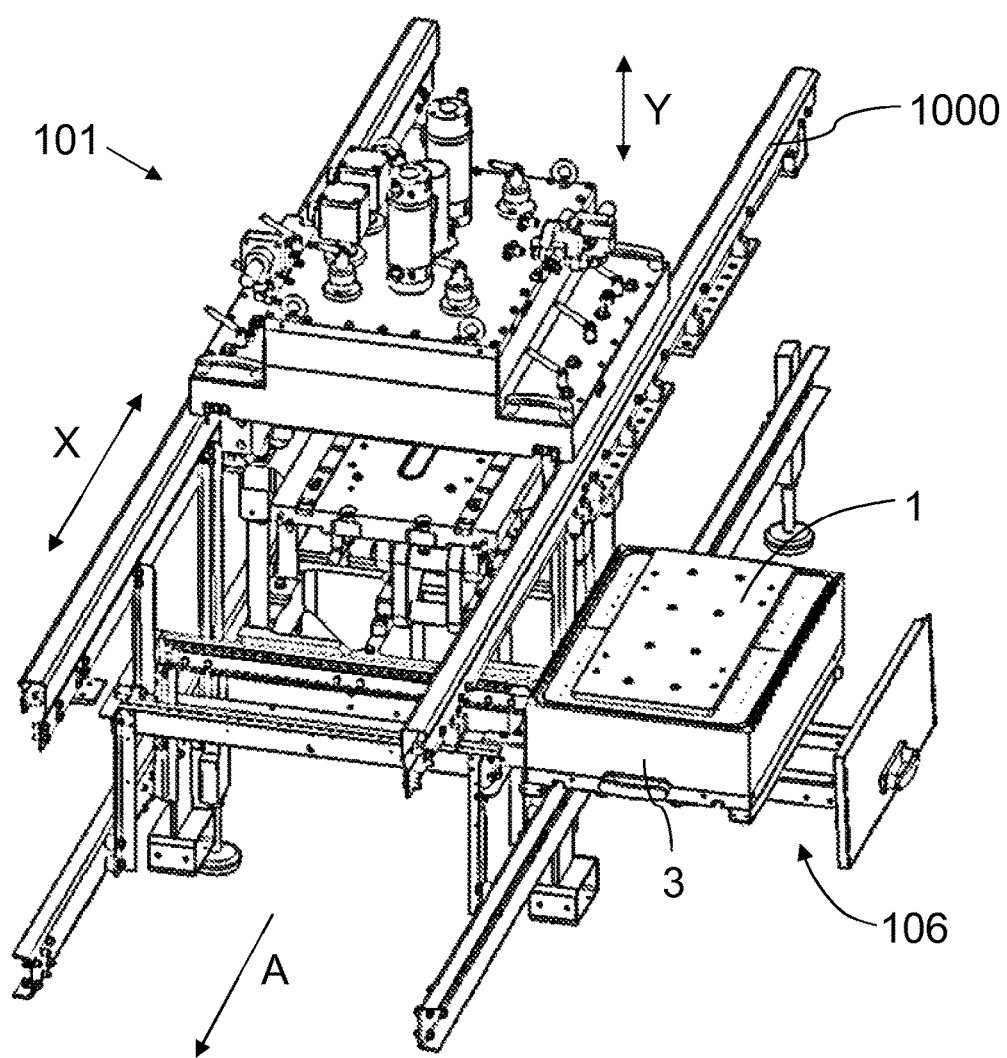
FIG. 2e shows a perspective view of the station of FIG. 2d, with the upper and lower tools located outside the station in a second lateral position as a result of a movement of the tools in a transverse direction after the movement in the replacement direction during a format change.

According to some implementations the removal step further comprises a movement of the tools 1 and 2 in a direction transverse to the replacement direction X as shown in FIG. 2e. to place the tools in a location more accessible to the operator. The tools 1 and 2, together with the box 3, therefore pass below the structure 1000 to a location outside the machine 100, as shown in FIG. 2e. Therefore, according to some implementations during the removal step the tools 1 and 2 (and the box 3) are moved in an L-shaped path.

According to some implementations not shown in the drawings, the replacement direction X is substantially horizontal and transverse with respect to the longitudinal layout of the thermoforming machine 100. According to such implementations the tools 1 and 2 pass below the structure 1000 with a single movement thereof. In this case, the guide rail 103 can be telescopic and may be extended until assuring that the box 3 is outside the station 101.

After the removal step, the tools 1 and 2 are replaced with new upper and lower tools in the replacement step. The operator manually takes the tools 1 and 2 out of the box 3 and introduces the new lower tool therein with the new upper tool being supported or resting on the new lower tool.

Another possibility is for the operator to replace the box 3 together with the tools 1 and 2, which would facilitate the format change and reduce the change time. This allows keeping the box 3 stored with the tools 1 and 2 such that in a format change it is sufficient to replace one box 3 with another. This furthermore facilitates storing the tools 1 and 2 because each upper tool 1 would be stored together with the corresponding lower tool 2.

According to some implementations the tools 1 and 2 are configured such that when the operator places one on top of the other in the box 3, the tools 1 and 2 are centered automatically as a result of the configuration of the upper tool 1 and/or of the lower tool 2. This centering allows completing the format change in a simple and effective manner, as will be discussed below. The same occurs when the upper tool 1 is released from the securing block 102.

Next, in the insertion step, the new upper and lower tools are introduced in the station 101 causing a movement opposite to that which is caused in the removal step, the box 3 being coupled to the table 4, the upper tool 1 being coupled to the securing block 102 and each tool 1 and 2 being taken to its original position so that the machine 100 is prepared for operation. The fact that the tools 1 and 2 are centered with respect to one another allows coupling the upper tool 1 and the securing block 102 in a simple and rapid manner because it is only necessary to act on the corresponding fastening means without the operator having to worry about other matters. The required movements are performed in the actuating direction Y in the desired order and for the desired elements to couple the box 3 to the table 4 and the securing block 102 to the new upper tool.

According to some implementations a template (not depicted in the drawings) is used, which is arranged between tools 1 and 2 so that the tools do not directly contact one another. The template is arranged on the lower tool 2, in contact with an upper facing surface of the lower tool 2, and the upper tool 1 is supported or rests on the lower tool 2, being arranged on the template, in direct contact with the template. In implementations wherein which a template is used, the format change steps are the same as disclosed above, with the differences due to the use of the template as explained below.

- In the decoupling step at least one of the tools 1 and 2 is caused to move towards the other tool in the actuating direction Y until the upper tool 1 is supported or rests on the lower tool 2, being supported or resting directly on the template.
- In the removal step the template is removed from the station together with the tools 1 and 2.
- In the replacement step the operator may replace the template along with the tools 1 and 2 or may use the same template if the template is compatible for use with the new upper and lower tools.
- In the insertion step the template is introduced in the station 101 together with the tools 1 and 2.

With the use of a template the method may further include the following steps:

- A preparation step in which the template is arranged on the lower tool 2. To that end the lower tool 2, together with the box 3, is previously removed from the station 101 (for example in the same way as in the removal step, with the difference being that the upper tool 1 is not removed), and it is again introduced in the station 101 with the template.
- An intermediate step in which once the new upper and lower tools and the template are introduced in the station 101 and the upper tool 1 is attached to the securing block 102, the template is removed from the lower tool 2. To that end the lower tool 2, together with the box 3, is previously removed from the station 101 (for example in the same way as in the removal step, with the difference being that the upper tool 1 is not removed), and it is again introduced in the station 101 without the template.

The template has a minimum height equal to the minimum specific distance, such that it prevents any of the tools 1, 2 from having to make a greater movement than what is needed in the operational working of the machine 100, which prevents having to resize the actuating means responsible for generating the movements. In this case the template will have holes to allow the passage of the protrusions 10 of the upper tool 1 (one per protrusion 10), if the upper tool has protrusions 10 (not necessary in a sealing station). With the upper tool 1 in its standby position (position in which it is prepared for the machine 100 to start its operation), the maximum height of the template allows the movement of the box 3 (with the lower tool 2 and the template) in the replacement direction X without the template running into the upper tool 1. In this case the template can have holes to allow the passage of the protrusions 10 of the upper tool 1 (one per protrusion 10) or a housing for each protrusion 10, if the upper tool has protrusions 10 (not necessary in a sealing station).

According to some implementations in use with a template, when the operator arranges the tools 1 and 2 one on top of the other in the box 3, the tools 1 and 2 are centered automatically as a result of the configuration of the template. The same applies when the upper tool 1 is released from the securing block 102.

As previously discussed, the thermoforming machine 100 comprises at least one station 101 and further comprises removal means suitable for guiding the movement of both tools 1 and 2 when they are withdrawn from the station 101 simultaneously and jointly and when they are introduced in the station, in at least the replacement direction X.

According to some implementations the removal means comprise at least one guide rail 103 over which the box 3 with the tools 1 and 2 moves in the replacement direction X, extending in the replacement direction X from the station 101 to outside the station 101. The guide rail 103 can be a static rail in the replacement direction X, or it can be a telescopic rail, for example extending in the replacement direction X at the same time the box 3 and the tools 1 and 2 are caused to move in the replacement direction X. The guide rail 103 can comprise bearings on the surface to facilitate the removal and introduction of the box 3.

Figure 6:
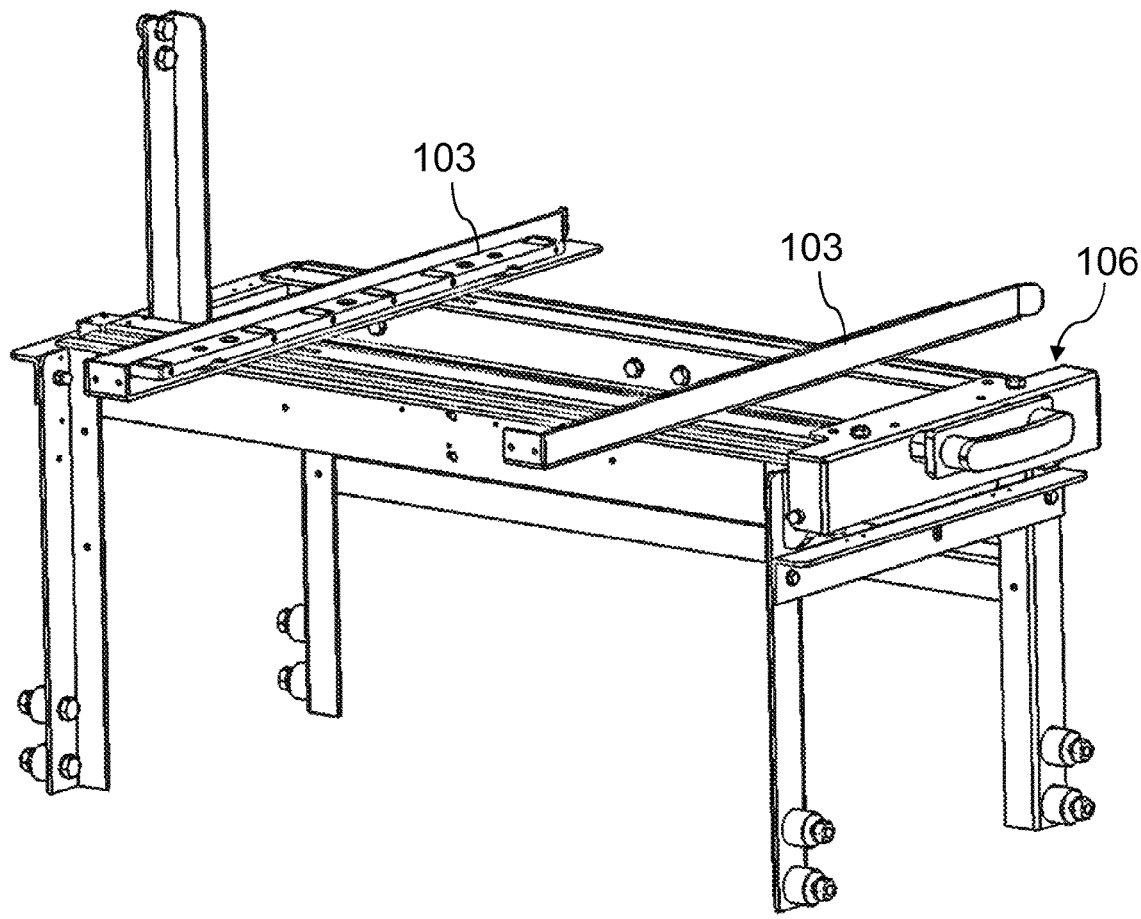
FIG. 6 shows a perspective view of part of the structure the machine of FIG. 1, where guide rails of the machine are shown.

According to some implementations, the removal means comprise two guide rails 103 separated from and parallel to one another as shown in FIG. 6, extending longitudinally in the forward movement direction A of the sheet at least to a position where it is assured that the tools 1 and 2 are outside the station 101 once movement in the replacement direction X over the guide rails 103 is completed. According to some implementations the guide rails 103 are arranged outside the station 101 in the forward movement direction A.

Figure 7:
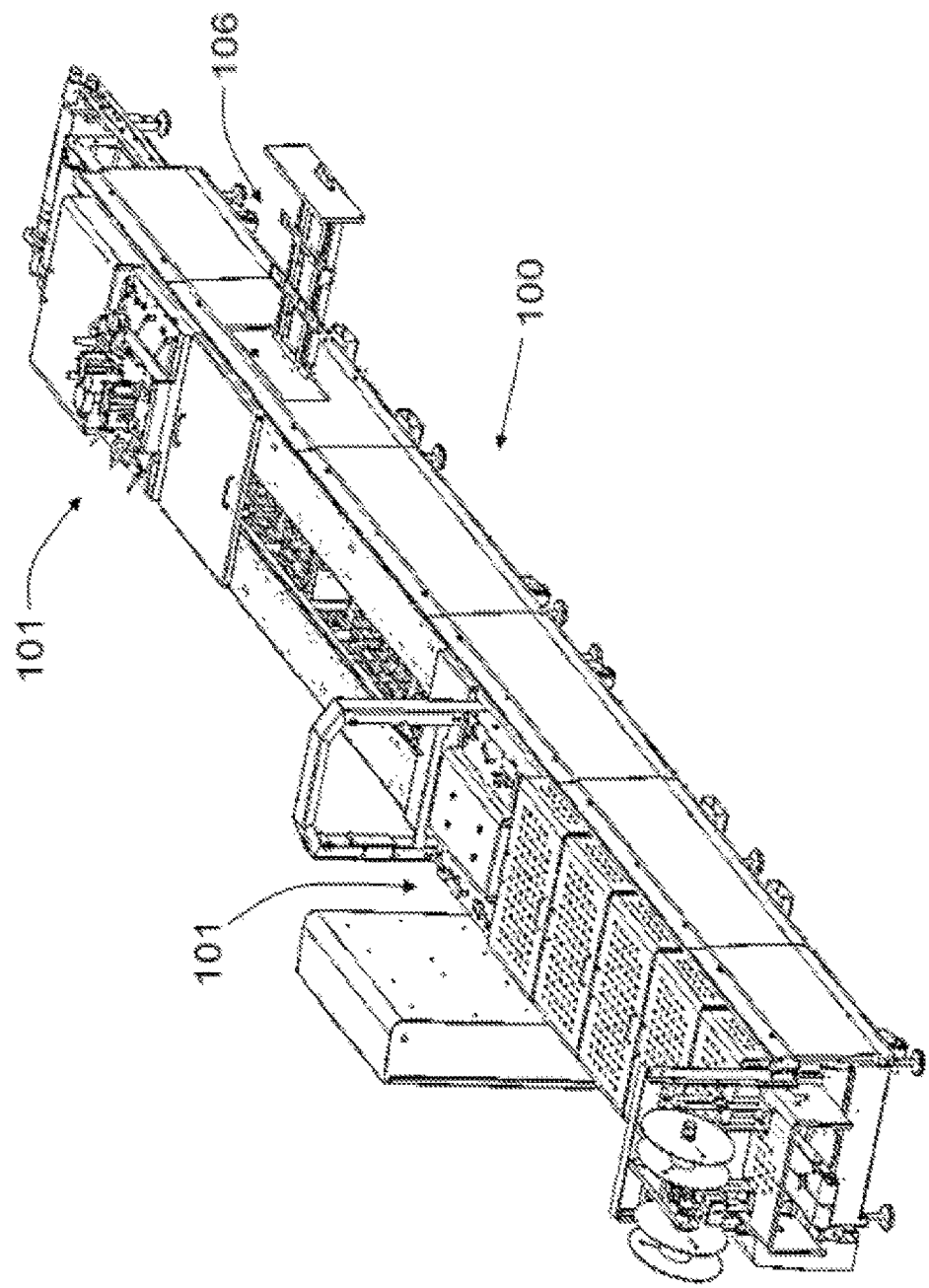
FIG. 7 shows a perspective view of the machine of FIG. 1, with a transversely moved guiding structure.

According to some implementations the machine 100 comprises a guiding structure 106 arranged below the guide rails 103, which is attached to the guide rails 103 and can move transversely as shown in FIG. 7, the transverse movement of the guiding structure 106 causing the transverse movement of the guide rails 103 and therefore of the box 3 with the tools 1 and 2 when the box 3 is on the guide rails 103, the tools 1 and 2 thus being removed from a structure 1000 of the machine 100. The operator thus may cause an L-shaped movement of the box 3 to replace the tools 1 and 2 with new upper and lower tools.

According to some implementations the box 3 is coupled to the table 4 of the station 101 by means of at least one T-shaped decoupling piston 104 which is housed in a T-shaped longitudinal groove 30 of the box 3. During the operational working of the machine 100, the decoupling piston 104 presses the box 3 against the table 4 by acting on the T-shaped longitudinal groove 30, the box 3 thus being fixed to the station 101. When the box 3 is decoupled from the table 4, the decoupling piston 104 moves in the actuating direction Y towards the securing block 102 with respect to the table 4. The height of the upper part of the groove 30 is greater than the height of the upper part of the decoupling piston 104, enabling movement in the actuating direction Y of the decoupling piston 104 which presses the box 3 against the table 4, when it is in a coupling position, keeping the table 4 and box 3 coupled to one another, and which does not press the box 3 against the table 4, when it is in a decoupling position as shown in FIG. 5, allowing the box 3 to be decoupled from the table 4 and thus be removed from the station 101.

According to some implementations when the decoupling piston 104 moves from the coupling position to the decoupling position to decouple the box 3 from the table 4, the integral movement of a separating element 105 fixed to the decoupling piston 104 is caused. The separating element 105 is housed in a housing 40 of the table 4 when the decoupling piston 104 is in the coupling position, and when the decoupling piston 104 passes to the decoupling position, the separating element 105 is lifted, projecting from the table 4 the separation distance E and pushing the box 3, which moves the separation distance E with respect to the table 4. The box 3 is thus decoupled from the table 4 by means of the movement of the decoupling piston 104, and the box 3 is separated from the table 4 by means of the movement of the separating element 105.

Figure 8:
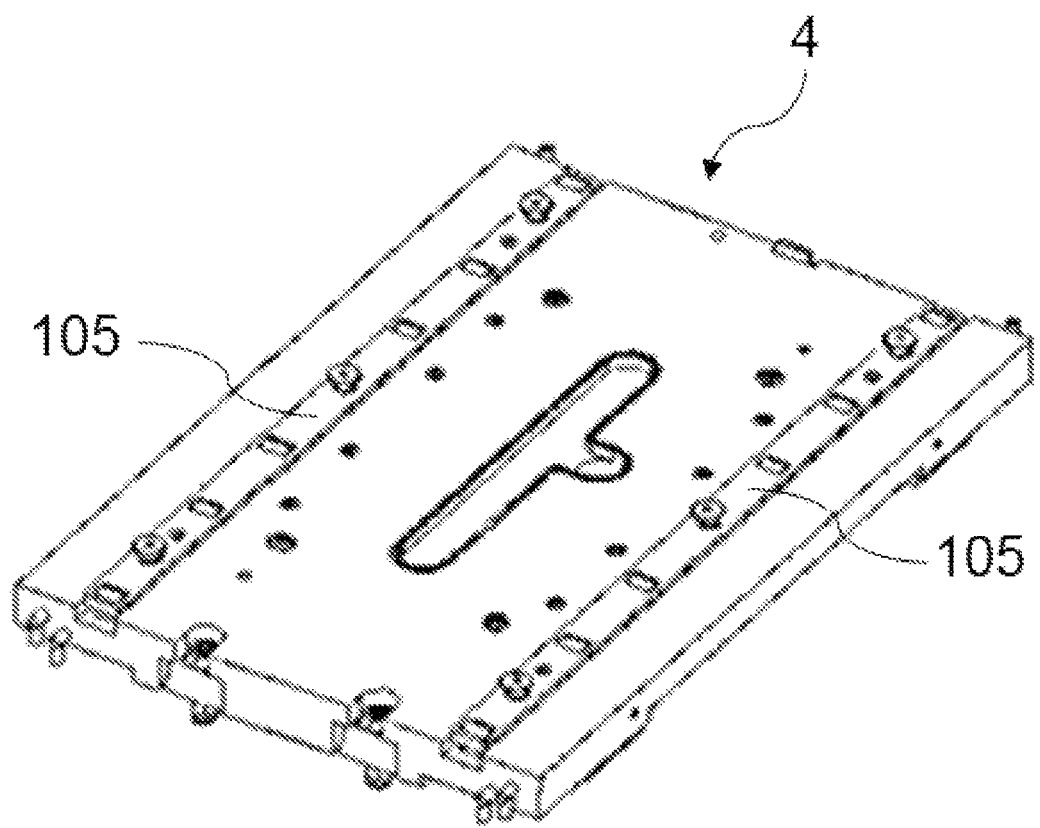
FIG. 8 shows a perspective view of a table of the machine of FIG. 1.

According to some implementations the separating element 105 corresponds with a longitudinal element such as that shown in FIG. 8, with bearings on the surface to facilitate the movement of the box 3 there above. The groove 30 is longitudinal such that the decoupling piston 104 in turn allows the guided movement of the box 3 in the replacement direction X to remove it from the station 101 or to introduce it therein, without the separating element 105 negatively affecting the movement.

According to some implementations, the decoupling piston 104 also acts as the separating element 105. When the decoupling piston 104 is operated, it is lifted in the actuating direction Y until its upper part contacts the box 3 and separates the box 3 from the table 4 the separation distance E. The box 3 then moves by means of sliding the groove 30 over the upper part of the decoupling piston 104, which in turn guides it to the guide rails 103. In this case, at least the upper part of the decoupling piston 104 can be covered with Teflon or an equivalent material in order to withstand contact with the box 3 during guiding.

According to some implementations the guide rails 103 are arranged on the separating element 105, and they are both housed in a housing 40 of the table 4 during the operational working of the machine 100. In such an implementation the guide rails 103 may comprise at least one telescopic or extendible guide configured to move together with the box 3 until the box 3 is arranged outside the station 101, when the decoupling piston 104 lifts the separating element 105 in the actuating direction Y, and the box 3 is decoupled from the table 4.

Figure 3A:
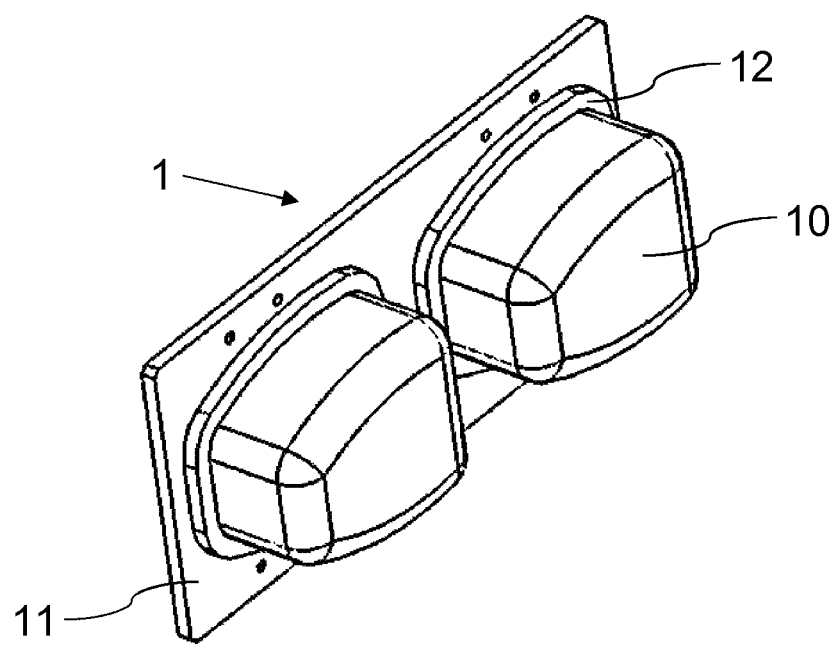
FIG. 3a shows by way of example a perspective view of an upper tool of the machine of FIG. 1.

As discussed above, in the forming station the upper tool 1 comprises at least one protrusion 10 projecting from a base plate 11 of the upper tool 1 which may be used, for centering the upper tool 1 with the lower tool 2. The upper tool 1 may comprise for each protrusion 10 at least one flange 12 projecting from the base plate 11 as shown in FIG. 3a. The flange 12 is suitable for facilitating automatic centering when the upper tool 1 is arranged on the lower tool 2, and according to some implementations the flange comprises a perimeter substantially equal to the perimeter of the corresponding cavity 20 in the lower tool 2, such that it fits in the cavity 20. In the sealing station the upper tool 1 does not comprise protrusions 10, so centering is performed differently. An intermediate tool or template (not depicted in the drawings) is preferably used for such purpose.

In any case centering is to be interpreted as a central axis of each protrusion 10 of the upper tool 1 being aligned with a central axis of the corresponding cavity 20 of the lower tool 2 (common axis 20a). If a template is used, the configuration of the template may allow auto-centering of the upper tool 1 with respect to the lower tool 2.

The thermoforming machine 100 may further comprises a cooling circuit as discussed above (not depicted in the drawings). The cooling circuit is at least partially comprised in the box 3 and serves to cool the lower tool 2 if required. The cooling circuit is part of a cooling system of the machine 100. In a removal step, as discussed above, at the same time the box 3 is decoupled from the table 4 the cooling circuit associated with the box 3 (if it has one) is closed. To that end, the box comprises a specific shut-off valve 107 which is automatically closed when the box 3 is decoupled from the table 4 (it will preferably have at least two shut-off valves 107, one for the inlet for the coolant fluid—generally water—and another for the outlet thereof). The table 4 may comprise a shut-off valve 108 associated with each shut-off valve 107 of the box 3, which is also closed when the box 3 is decoupled from the table 4. When the box 3 is coupled to the table 4, the corresponding valves 107 and 108 contact one another and open, allowing the passage of coolant fluid therethrough.

What is claimed is:

1. A method of changing first upper and lower tools used in a station of a thermoforming machine, in a normal operation of the thermoforming machine a sheet is advanced in a forward movement direction along a horizontal plane through the station with the first upper tool residing above the sheet and the first lower tool residing below the sheet, one or both of the first upper and lower tools are capable of moving in a substantially vertical actuating direction to cause each of the first upper and lower tools to act on the sheet, the method comprising:
   (a) removing all or a portion of the sheet located between the first upper and lower tools so that the first upper and lower tools may be moved together without contacting the sheet,
   (b) from a starting position in which the first upper and lower tools are located in the station and spaced apart from one another, moving one or both of the first upper and lower tools in the vertical actuating direction so that the first upper tool is supported on the first lower tool and so that the entirety of each of the first upper and lower tools is vertically positioned below the horizontal plane; and
   (c) moving the first upper and lower tools simultaneously and jointly out of the station to a first location in a replacement direction different from the actuating direction, the first location being located inside the thermoforming machine, below the horizontal plane.

2. A method according to claim 1, further comprising:
   (d) simultaneously and jointly moving the first upper and lower tools from the first location to a second location in a direction transverse to the replacement direction, the second location being located outside the thermoforming machine below the horizontal plane.

3. A method according to claim 1, further comprising:
   (d) obtaining second upper and lower tools to replace the first upper and lower tools,
   (e) placing the second upper and lower tools at the first location with the second upper tool being supported on the second lower tool; and
   (f) simultaneously and jointly moving the second upper and lower tools from the first location to the station in the replacement direction.

4. A method according to claim 2, further comprising:
   (e) obtaining second upper and lower tools to replace the first upper and lower tools, (f) placing the second upper and lower tools at the second location with the second upper tool being supported on the second lower tool;

(g) simultaneously and jointly moving the second upper and lower tools from the second location to the first location in the transverse direction; and (h) simultaneously and jointly moving the second upper and lower tools from the first location to the station in the replacement direction.

5. A method according to claim 1, wherein the replacement direction is substantially horizontal.

6. A method according to claim 1, wherein the replacement direction is substantially longitudinal in the forward movement direction.

7. A method according to claim 1, wherein one of the first upper and lower tools comprises at least one cavity and the other of the first upper and lower tools comprises at least one protrusion corresponding with the at least one cavity, the at least one cavity and at least one protrusion configured to produce containers having a specific shape, at the same time as moving one or both of the first upper and lower tools in the vertical actuating direction so that the first upper tool is supported on the first lower tool, the first upper tool is centered with respect to the first lower tool as a result of the configuration of the at least one cavity and at least one protrusion.

8. A method according to claim 1, further comprising situating a template between the first upper and lower tools, at the same time as moving one or both of the first upper and lower tools in the vertical actuating direction so that the first upper tool is supported on the first lower tool, the first upper tool is centered with respect to the first lower tool as a result of the template and first upper and lower tools having complimentary features that cause the first upper and lower tools to be centered with respect to one another.

9. A method according to claim 1, wherein one or both of the first upper and lower tools are caused to move towards the other tool until the first upper tool is supported on the first lower tool, and the first upper tool is subsequently decoupled from a securing block arranged in the station over the first upper tool, the first upper tool being thus decoupled from the station to allow its subsequent removal in the replacement direction, and wherein, with the first upper tool being decoupled from the station, the first lower tool and the first upper tool are separated from the securing block at least a certain separation distance, and a box where the first lower tool is housed is decoupled from a table of the station being moved a distance equal to the separation distance in the actuating direction towards the securing block for being vertically positioned below the horizontal plane and decoupled from the station to allow its subsequent removal in the replacement direction.

10. A method according to claim 1, wherein the thermoforming machine includes a structure that secures and moves the sheet in the forward movement direction, the step of removing all or a portion of the sheet located between the first upper and lower tools so that the first upper and lower tools may be moved together without contacting the sheet comprising a cutting of the sheet to form a window through which the first upper tool passes when moved to the first location without removing the sheet from the structure that secures and moves the sheet in the forward movement direction.

11. A method of changing first upper and lower tools used in a station of a thermoforming machine, in a normal operation of the thermoforming machine a sheet is advanced in a forward movement direction along a substantially horizontal plane through the station with the first upper tool residing above the sheet and the first lower tool residing below the sheet, one or both of the first upper and lower tools are capable of moving in a substantially vertical actuating direction to cause each of the first upper and lower tools to act on the sheet, the method comprising:

(a) removing all or a portion of the sheet located between the first upper and lower tools so that the first upper and lower tools may be moved together without contacting the sheet, (b) from a starting position in which the first upper and lower tools are located in the station and spaced apart from one another, moving one or both of the first upper and lower tools in the vertical actuating direction so that the first upper tool is supported on the first lower tool and so that each of the first upper and lower tools is vertically positioned below the horizontal plane; and (c) moving the first upper and lower tools simultaneously and jointly out of the station to a first location in a replacement direction different from the actuating direction, the first location being located inside the thermoforming machine, below the horizontal plane;

wherein the thermoforming machine includes a structure that secures and moves the sheet in the forward movement direction, the step of removing all or a portion of the sheet located between the first upper and lower tools so that the first upper and lower tools may be moved together without contacting the sheet comprising a cutting of the sheet to form a window through which the first upper tool passes when moved to the first location without removing the sheet from the structure that secures and moves the sheet in the forward movement direction.

* * * * *